Oct. 27, 1953
D. P. SCHWESTER ET AL
2,657,075
METALLIC BELLOWS
Filed July 12, 1951
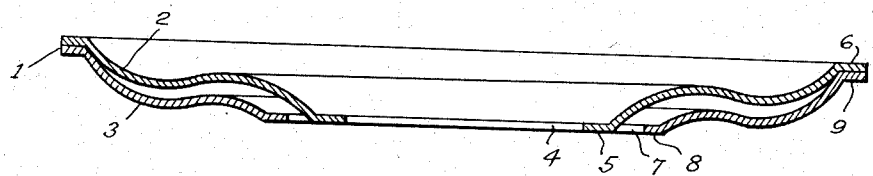
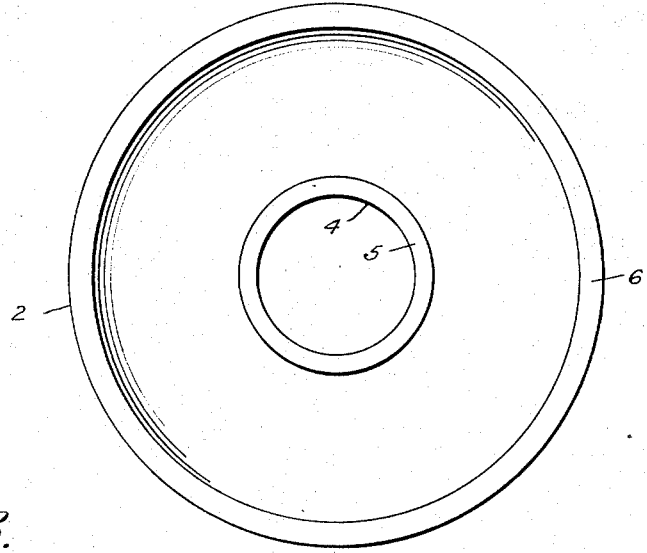
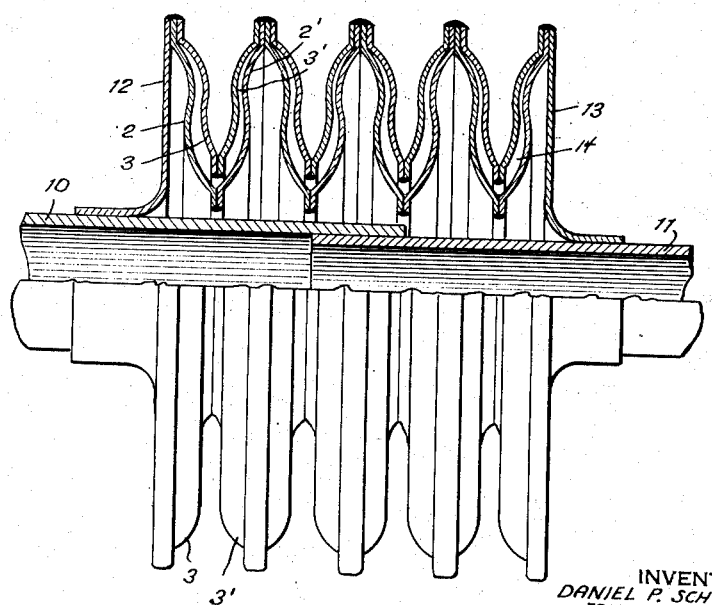
INVENTORS
DANIEL P. SCHWESTER
JOHN J. PHILLIPS
BY
ATTORNEYS Patented Oct. 27, 1953

2,657,075

UNITED STATES PATENT OFFICE 2,657,075

METALLIC BELLOWS

Daniel P. Schwester, East Orange, and John J. Phillips, West Orange, N. J., assignors, by mesne assignments, to Titeflex, Inc., Newark, N. J., a corporation of Massachusetts Application July 12, 1951, Serial No. 236,332

2 Claims. (Cl. 285—90)

The present invention relates generally to improvements in the construction of bellows of the type which consists of a number of discs suitably shaped in order that each may be joined at its outer edge to a similar disc at one side and at its inner edge to a similar disc on the other side. This type of bellows is well known and widely used for connecting movable parts to provide a fluid-tight expansion joint therebetween.

It is an object of the present invention to provide a bellows of improved construction which will withstand high pressure and high heat conditions, that is to say, a bellows which will continue to operate satisfactorily under conditions where the difference in pressure between the inside and the outside is relatively high, or where the difference in temperature between the inside and outside is high, or where both conditions exist simultaneously.

It is a further object of the invention to provide a bellows structure in which the metal diaphragms will withstand flexing due to high frequency vibrations.

Generally, it is an object of the invention to provide a bellows structure which will be economical to manufacture and durable in service.

The invention may find many practical applications, one of which, selected for purposes of illustration, is that of providing a flexible fluid-tight seal between two relatively movable sections of a pipe or conduit. Such an illustrative embodiment of the invention is shown in the accompanying drawings wherein:

Figure 1 is a central vertical section of the two elements of a diaphragm unit embodying our invention;

Figure 2 is a top plan view of the diaphragm units of Figure 1 upon a reduced scale; and Figure 3 is a view partly in central longitudinal vertical section and partly in elevation of a bellows constructed with diaphragms of the type illustrated in Figures 1 and 2.

Referring to Figures 1 and 2 of the drawings, it will be seen that the diaphragm unit 1 therein illustrated consists of two dished annular diaphragms 2 and 3. Both are formed from sheet metal herein shown as of uniform thickness and flexibility throughout. If desired, each diaphragm may be formed with an area of greater flexibility midway between the inner and outer margins as described in our copending application Serial No. 179,902, filed August 17, 1950. The diaphragm 2 is formed with a central aperture 4 surrounded by a land 5, while the outer margin is formed with a land 6 in a plane offset from that of the land 5. Similarly the diaphragm 3 is formed with a central aperture 7, somewhat larger than the aperture 4 in the diaphragm 2, and with a land 8 surrounding the central aperture 7. At the outer margin of the diaphragm 3 another land 9 is formed in a plane offset from the plane of the land 8. It will be observed that when the two diaphragms are laid together as shown in Figure 1, the lands 5 and 8 lie in a common plane, while the lands 6 and 9 lie in adjacent planes so that the lower surface of land 6 touches the upper surface of land 9. It will also be observed that the two diaphragms 2 and 3 are so shaped that when laid together, as shown in the drawings, there is a substantial spacing of the diaphragms at all points except where the lands 6 and 9 are in contact with each other.

Figure 3 illustrates a typical bellows structure constructed from the diaphragm units of Figures 1 and 2. Therein two telescoping pipes 10 and 11 are shown and may constitute a conduit connecting relatively movable parts of a fluid transmission system. A flange 12 is carried by pipe 10 while a flange 13 is carried by pipe 11. In the finished structure these flanges are suitably secured to the pipes as by welding. The outer edge of one of these flanges is connected to the outer edge of the other by a bellows structure constructed of diaphragm units previously described. Eight such units are illustrated but it will be understood that a greater or less number may be used depending upon such factors as the extent and frequency of relative movement between pipes 10 and 11, the pressure of the fluid within the pipes, and the temperature of the fluid passing through them.

The manner of assembling the bellows structure shown in Figure 3 will now be described. Ordinarily the assembly will start at one end and progress joint by joint to the other end, although the procedure may be varied as will be later indicated. In any event a suitable assembly jig or fixture will be required to hold the diaphragms in place by engagement with the central aperture while the outer edges are being welded and by engagement with the outer edge while the inner edges are being welded. The first step is to place the flange 12 in the jig, then place the two diaphragm elements 2 and 3 therein and weld the outer margins of these two diaphragm elements together and to the outer periphery of the flange. The next step is to place the flange and attached diaphragms in another jig, move the diaphragm 3' into place and weld together the inner margins of diaphragms 3 and 3'. Thereafter diaphragm 2' is moved into position and held by its outer edge while the inner edges of diaphragms 2 and 2' are welded.

The assembly of the entire bellows may be carried out by repeating in alternation the steps just described in a manner which will be readily understood without further explanation. If desired the procedure may be varied by assembling one-half of the bellows as above described, then assembling the other half and finally joining the two halves by welding together the outer edges of four diaphragm elements at the mid-point of the bellows.

It will be observed that with the diaphragms assembled into a bellows structure as shown in Figure 3, closed air spaces 14 are provided between the inside diaphragm elements 2, 2' and the outside diaphragm elements 3, 3'. Similar air spaces are provided between corresponding sets of diaphragms throughout the structure. These air spaces serve to insulate to some degree the outer from the inner diaphragms thus cutting down heat losses in case the two pipes 10 and 11 form part of a distribution system for fluid at high temperatures. This double walled bellows also provides a safety factor in case the pipes 10 and 11 are part of a high pressure system, because it is unlikely that a leak will develop at the same time in both the inner and outer diaphragms. Moreover, the provision of what is in effect a double walled diaphragm permits the use of thinner and more flexible metal for the diaphragm elements under service conditions which involve high frequency vibrations or which would normally require a heavier gauge of metal.

The invention is not limited to the specific embodiments herein described and shown in the drawings but may be variously modified and embodied within the scope of the subjoined claims.

We claim as our invention:

1. A metallic bellows structure adapted for connecting two relatively movable parts to form a flexible and expansible fluid-tight joint therebetween, said bellows structure comprising, in combination, a plurality of connected diaphragm units each of which consists of two dished annular diaphragm elements of the same outside diameter and each having an inner margin forming a central aperture which is of a greater diameter in one of said elements than in the other element of the pair, the outer margins of both members of a pair being united fluid-tight entirely around the outer margins of both members to the outer margins of an adjacent oppositely facing pair, and the inner margin of each member of the first pair being united fluid-tight around its margin solely to the inner margin of the corresponding member of another adjacent oppositely facing pair.

2. A metallic bellows structure according to claim 1 in which the assembled diaphragm elements enclose a plurality of air spaces isolated from each other longitudinally along the bellows, each between an inner wall constituted by the diaphragm elements of larger area and an outer wall constituted by the diaphragm elements of lesser area.

DANIEL P. SCHWESTER.
JOHN J. PHILLIPS.

References Cited in the file of this patent
UNITED STATES PATENTS

| Number | Name | Date |
|---|---|---|
| 2,187,347 | Guarnaschelli | Jan. 16, 1940 |
| 2,348,833 | Miller | May 16, 1944 |
| 2,444,988 | Guarnaschelli | July 13, 1948 |
| 2,487,410 | Baker | Nov. 8, 1949 |